(12) United States Patent
Idogawa et al.

(10) Patent No.: US 6,647,952 B2
(45) Date of Patent: Nov. 18, 2003

(54) CONTROL APPARATUS FOR CYLINDER INJECTION TYPE INTERNAL COMBUSTION ENGINE

(75) Inventors: Masanao Idogawa, Toyota (JP); Hirohisa Kishi, Nagoya (JP); Noboru Takagi, Toyota (JP); Osamu Hosokawa, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 93 days.

(21) Appl. No.: 10/032,501

(22) Filed: Jan. 2, 2002

(65) Prior Publication Data

US 2002/0100453 A1 Aug. 1, 2002

(30) Foreign Application Priority Data

Jan. 31, 2001 (JP) .......................... 2001-023723

(51) Int. Cl.⁷ .................................. F02B 5/00
(52) U.S. Cl. ................... 123/305; 123/406.55
(58) Field of Search ............... 123/305, 295, 123/406.26, 406.55, 406.47, 406.45

(56) References Cited

U.S. PATENT DOCUMENTS 5,785,031 A     7/1998  Akimoto et al.
6,058,906 A  *  5/2000  Yoshino ................. 123/295
6,089,206 A  *  7/2000  Suzuki et al. ........... 123/295
6,434,929 B1 *  8/2002  Nishimura et al. ........ 60/278

FOREIGN PATENT DOCUMENTS

| EP | 0 824 188 A2 | 2/1998 |
| EP | 0 849 455 A2 | 6/1998 |
| JP | 04-187841 A  | 7/1992 |
| JP | 10-030468    | 2/1998 |
| JP | 2001-082216  | 3/2001 |

* cited by examiner

*Primary Examiner*—Mahmoud Gimie
(74) *Attorney, Agent, or Firm*—Kenyon & Kenyon (57) ABSTRACT

A control apparatus for a cylinder injection type internal combustion engine in which the fuel injection mode of the engine is switched between a compression stroke injection and an intake stroke injection. When the engine is cold, the compression stroke injection is selected for the fuel injection mode so that injected fuel collides with the top surface of a piston and is directed toward the vicinity of a spark plug. When the fuel injection mode is switched from the compression stroke injection to the intake stroke injection, the ignition timing is delayed during the execution of the intake stroke injection from when the fuel injection mode is switched until a predetermined period elapses compared with a case when the fuel injection mode is not switched.

17 Claims, 7 Drawing Sheets

CONTROL APPARATUS FOR CYLINDER INJECTION TYPE INTERNAL COMBUSTION ENGINE

BACKGROUND OF THE INVENTION

The present invention relates to a control apparatus for a cylinder injection type internal combustion engine that switches the fuel injection mode of the engine between a compression stroke injection and an intake stroke injection.

Fuel is directly injected from a fuel injection valve to a combustion chamber in the cylinder injection type internal combustion engine. In this type of internal combustion engine, fuel is injected at the final stage of the compression stroke of a piston, during which the piston approaches the fuel injection valve. Therefore, the injected fuel collides with the top surface of the piston. As a result, the injected fuel is directed toward a spark plug. This is disclosed in Japanese Unexamined Patent Publication No. 4-187841.

The compression stroke injection allows air-fuel mixture having a high fuel concentration to be formed in the vicinity of the spark plugs and to be burned. This is called stratified charge combustion. Therefore, even when the average fuel concentration of the air-fuel mixture is set low, or the ratio of air to fuel is relatively high, stable combustion is obtained.

The typical internal combustion engine including the cylinder injection type internal combustion engine is provided with a catalyst converter (hereinafter, simply referred to as catalyst) in an exhaust system. Unburned components such as hydrocarbons included in the emission gas are purified by the oxidation-reduction reaction of the catalyst. However, the emission purification performance of the catalyst tends to decrease when the bed temperature of the catalyst is not increased enough due to a low temperature of the emission gas, for example, when the engine is cold.

Therefore, for the cylinder injection type internal combustion engine, the compression stroke injection is selected for the fuel injection mode when the engine is cold. Then, stratified charge combustion is executed. When the compression stroke injection is executed while the engine is cold, the fuel concentration of the air-fuel mixture is low, which reduces the emission of unburned component. Therefore, even when the emission purification performance of the catalyst is decreased, the deterioration of emission quality due to the emission of unburned component is suppressed.

When the fuel injection amount increases, according to the increase of the engine load, the fuel concentration of the air-fuel mixture in the vicinity of the spark plugs increases. In this state, to avoid misfires, the compression stroke injection is not executed. Therefore, when the compression stroke injection is not allowed because of, for example, a great engine load, the fuel injection mode is switched from the compression stroke injection to the intake stroke injection.

However, when the fuel injection mode is switched from the compression stroke injection to the intake stroke injection while the engine is cold, the following problems occur. During the compression stroke injection, the fuel is injected against the top surface of the piston. Therefore, the fuel adheres to the top surface of the piston. When the engine is cold, the top surface of the piston tends to be cold and the adhered fuel resists vaporization. Accordingly, the amount of fuel that adheres to the top surface of the piston gradually increases. If the fuel injection mode is switched from compression stroke injection to intake stroke injection when the amount of adhered fuel is increased, the adhered fuel vaporizes by the combustion heat during, for example, the exhaust stroke after the air-fuel mixture is combusted. Thus, some of the vaporized fuel is exhausted as unburned discharge gas. Particularly, during the execution of intake stroke injection while the engine is cold, the air-fuel mixture needs to have a high fuel concentration to stabilize combustion. Therefore, the amount of unburned discharge gas contained in the emission gas increases accordingly. Therefore, when the fuel injection mode is switched, the amount of unburned discharge gas increases temporarily and the deterioration of the emission quality, such as the occurrence of black smoke, cannot be avoided.

BRIEF SUMMARY OF THE INVENTION

The objective of the present invention is to provide a control apparatus that suppresses deterioration of the emission quality due to an increase of the amount of the unburned discharge gas that is caused when the fuel injection mode is switched from the compression stroke injection to the intake stroke injection.

To achieve the foregoing objective, the present invention provides a control apparatus for a cylinder injection type internal combustion engine. The fuel injection mode of the engine is switched between a compression stroke injection and an intake stroke injection. When the engine is cold, the compression stroke injection is selected for the injection mode so that injected fuel collides with the top surface of a piston and is directed toward the vicinity of a spark plug. The control apparatus includes a delay correction means. When the fuel injection mode is switched from the compression stroke injection to the intake stroke injection, the delay correction means delays the ignition timing during the execution of the intake stroke injection from when the fuel injection mode is switched until a predetermined period elapses compared with a case when the fuel injection mode is not switched.

The present invention also provides a control apparatus for a cylinder injection type internal combustion engine. The fuel injection mode of the engine is switched between a compression stroke injection and an intake stroke injection. When the engine is cold, the compression stroke injection is selected for the injection mode so that injected fuel collides with the top surface of a piston and is directed toward the vicinity of a spark plug. The control apparatus includes decrease correction means and determining means. When the fuel injection mode is switched from the compression stroke injection to the intake stroke injection, the decrease correction means decreases the fuel injection amount during the execution of the intake stroke injection from when the fuel injection mode is switched until a predetermined period elapses. Based on the condition of the engine when the compression stroke injection is selected for the fuel injection mode, the determining means estimates the amount of fuel adhered on the top surface of the piston at time when the fuel injection mode is switched from the compression stroke injection to the intake stroke injection. The determining means determines whether the estimated adhered fuel amount is greater than or equal to a predetermined amount. If the determining means determines that the estimated adhered fuel is greater than or equal to the predetermined amount, the decrease correction means executes decrease correction of the fuel injection amount.

The present invention also provides a control apparatus for a cylinder injection type internal combustion engine. The fuel injection mode of the engine is switched between a compression stroke injection and an intake stroke injection. When the engine is cold, the compression stroke injection is selected for the injection mode so that injected fuel collides with the top surface of a piston and is directed toward the vicinity of a spark plug. The control apparatus includes decrease correction means and setting means. When the fuel injection mode is switched from the compression stroke injection to the intake stroke injection, the decrease means decreases the fuel injection amount during the execution of the intake stroke injection from when the fuel injection mode is switched until a predetermined period elapses compared with a case when the fuel injection mode is not switched. Based on the condition of the engine during the execution of the compression stroke injection, the setting means estimates the amount of fuel adhered on the top surface of the piston at the time when the fuel injection mode is switched from the compression stroke injection to the intake stroke injection. The setting means extends the predetermined period as the estimated adhered fuel amount increases.

A further aspect of the present invention is a control method for a cylinder injection type internal combustion engine. The fuel injection mode of the engine is switched between a compression stroke injection and an intake stroke injection. When the engine is cold, the compression stroke injection is selected so that injected fuel collides with the top surface of a piston and is directed toward the vicinity of a spark plug. The control method includes when the fuel injection mode is switched from the compression stroke injection to the intake stroke injection, delaying the ignition timing during the execution of the intake stroke injection from when the fuel injection mode is switched until a predetermined period elapses compared with a case when the fuel injection modes are not switched.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described.

Figure 1:
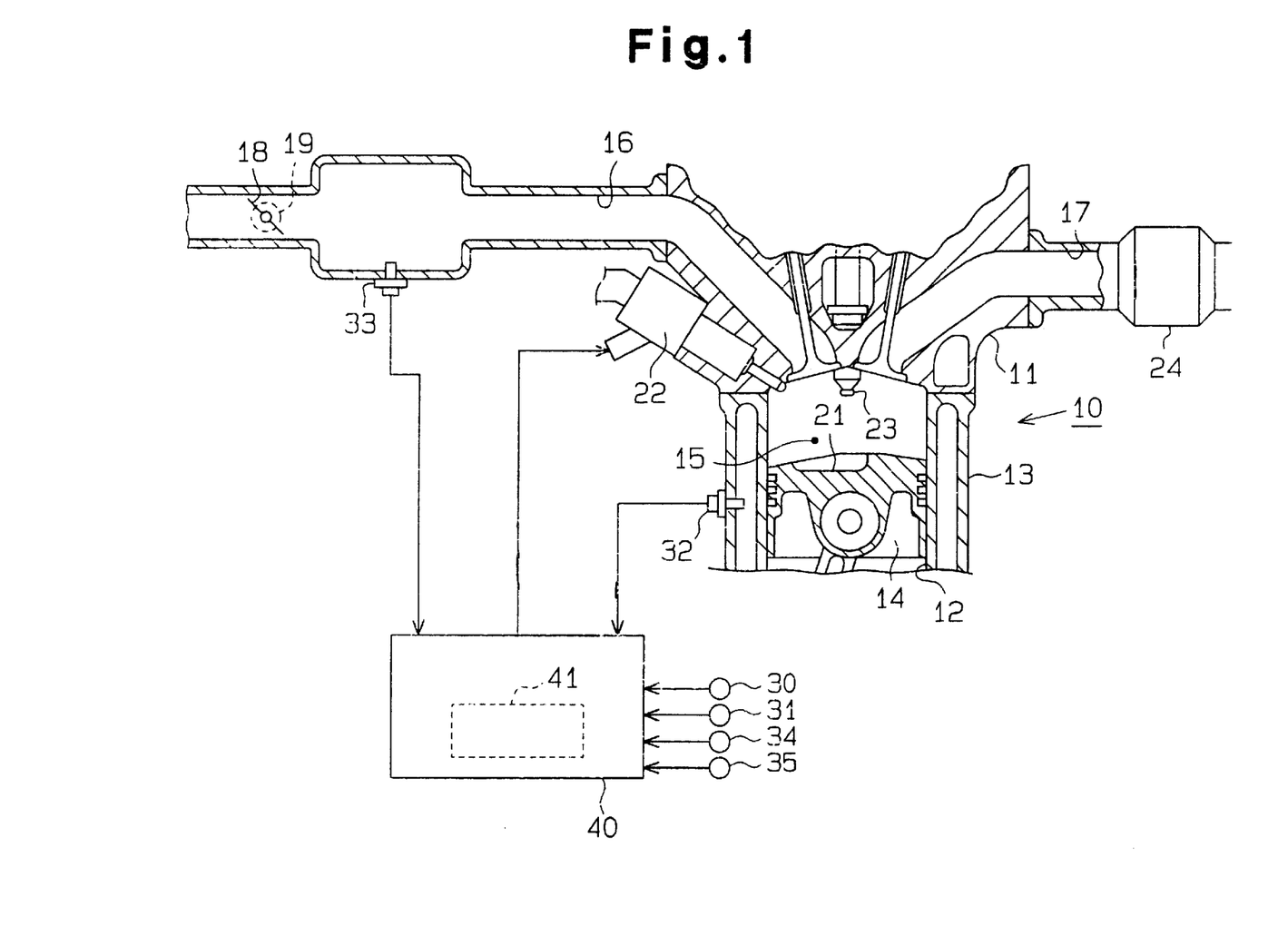
FIG. 1 is a schematic diagram illustrating a control apparatus and an internal combustion engine according to a preferred embodiment of the present invention.

FIG. 1 shows a schematic diagram of a control apparatus according to the preferred embodiment and an internal combustion engine 10 that is provided with the control apparatus.

As shown in FIG. 1, the internal combustion engine 10 includes a cylinder head 11 and a cylinder block 13, which has a plurality of cylinders 12 (only one cylinder is shown in FIG. 1). A piston 14 is accommodated in each cylinder 12. A combustion chamber 15 is defined by each piston 14, the inner wall of the corresponding cylinder 12, and the cylinder head 11. An intake passage 16 and a discharge passage 17 are connected to the combustion chambers 15.

A three-way catalytic converter (hereinafter, simply referred to as catalyst) 24 is located inside the discharge passage 17. The catalyst 24 purifies unburned discharge gas, such as hydrocarbons and nitrogen oxides included in the emission gas, by the catalyst oxidation-reduction reaction. A throttle valve 18 is located in the intake passage 16. The opening degree of the throttle valve 18 (throttle opening degree) is adjusted by a throttle motor 19. This adjusts the amount of intake air supplied to the combustion chambers 15 through the intake passage 16.

Fuel injection valves 22 and spark plugs 23 are arranged in the cylinder head 11. Each fuel injection valve 22 corresponds to one of the combustion chambers 15 and directly injects fuel into the corresponding combustion chamber 15. Each spark plug 23 corresponds to one of the combustion chambers 15 and ignites the air-fuel mixture in the corresponding combustion chamber 15. The fuel injection valves 22 are connected to a delivery pipe (not shown). High-pressure fuel is delivered through the delivery pipe from a high-pressure fuel feed system (not shown) and supplied to the fuel injection valves 22.

A cavity 21 is formed on the top surface of each piston 14. Fuel that is injected from each fuel injection valve 22 during the execution of the compression stroke injection hits the inner wall of the corresponding cavity 21. The fuel is then distributed towards the corresponding spark plug 23. Thus, the atomized fuel with high fuel concentration is concentrated in the vicinity of each spark plug 23 and the stratified charge combustion is executed.

The internal combustion engine 10 is provided with sensors for detecting the condition of the engine. A crank angle sensor 30 and a cam angle sensor 31 are provided near the crankshaft and the camshaft, which integrally rotates with the crankshaft (not shown). The rotational speed of the crankshaft (engine speed NE) and the rotational phase of the crankshaft (crank angle) are detected based on signals from the crank angle sensor 30 and the cam angle sensor 31. The cylinder block 13 is provided with a coolant temperature sensor 32 for detecting the temperature of the coolant (coolant temperature THW) in the internal combustion engine 10 in substitution for the engine temperature. Furthermore, an intake pressure sensor 33, which detects the intake pressure, is provided in the intake passage 16 downstream of the throttle valve 18. The amount of intake air (intake air amount) supplied to the combustion chambers 15 through the intake passage 16 is computed based on the engine speed and the intake pressure detected by the intake pressure sensor 33. The delivery pipe, which distributes fuel to the fuel injection valves 22, is provided with a fuel pressure sensor 34 for detecting the pressure of the fuel (fuel pressure) inside the delivery pipe as the fuel injection pressure. An intake temperature sensor 35 for detecting the temperature of intake air (intake temperature) is provided in the vicinity of the air cleaner (not shown) upstream of the intake passage 16.

Detection signals of the sensors 30, 31, 32, 33, 34, and 35 are sent to an electronic control unit 40 (ECU 40) of the internal combustion engine 10. The ECU 40 executes a variety of controls by driving the fuel injection valves 22, the spark plugs 23, and the throttle motor 19 based on the detection signals sent from the sensors 30 to 35. Also, the ECU 40 includes a memory 41 for storing programs and operation maps for executing the variety of controls, and a variety of data, which are computed when executing the controls.

A fuel injection control and an ignition timing control performed by the control apparatus according to the preferred embodiment will now be described with reference to FIGS. 2 to 9.

The fuel injection control detects the coolant temperature THW during cranking of the engine (hereinafter, referred to as the coolant temperature during cranking THWST) and controls the fuel injection mode based on the coolant temperature during cranking THWST. The fuel injection mode will be described below.

Figure 5:
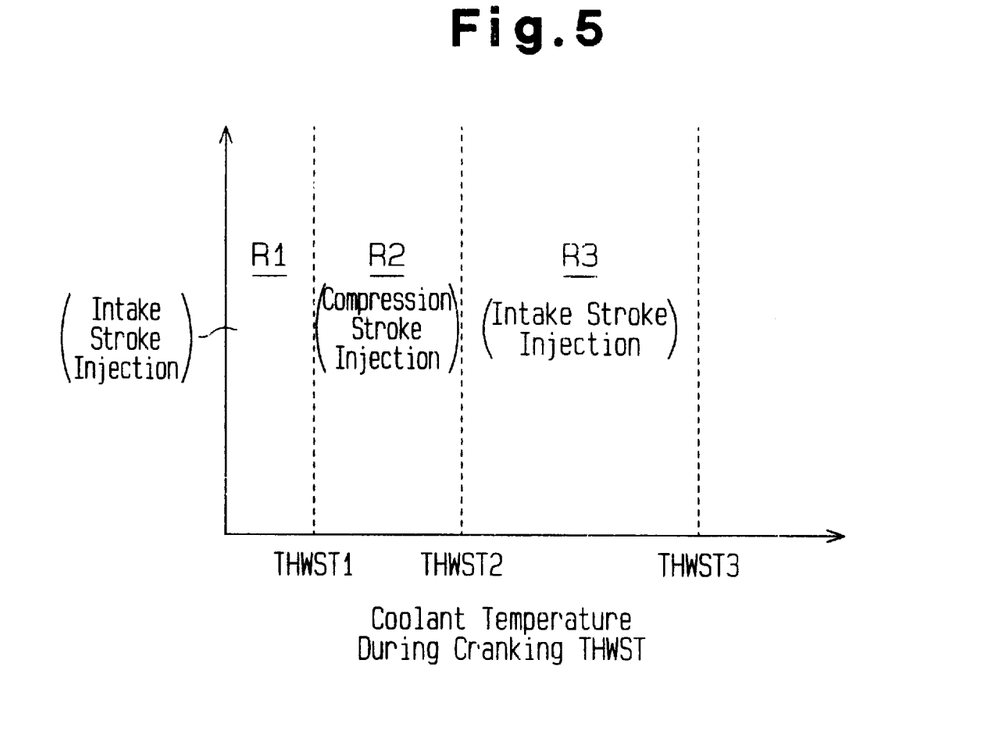
FIG. 5 is a map illustrating the relationship between the coolant temperature during cranking and the fuel injection mode.

FIG. 5 is a map illustrating the relationship between the coolant temperature during cranking THWST and the corresponding fuel injection mode.

As shown in FIG. 5, for example, if the coolant temperature during cranking THWST is in a predetermined temperature range R2 (THWST1≦THWST≦THWST2), the compression stroke injection is selected for the fuel injection mode. For example, a predetermined temperature THWST1 is set to 15 degrees Celsius and a predetermined temperature THWST2 is set to 40 degrees Celsius.

During the execution of the compression stroke injection, the degree of opening of the throttle valve 18 is increased compared with the case when the intake stroke injection is executed. This increases the intake air amount. Also, fuel is injected at the final stage of the compression stroke so that the injected fuel is concentrated in the vicinity of the spark plug 23. Thus, the stratified charge combustion is executed. Therefore, while stabilizing the combustion by executing the stratified charge combustion, the air-fuel ratio is set relatively high compared with the case when the intake stroke injection is executed. This suppresses the fuel concentration of the air-fuel mixture. For example, the air-fuel ratio is set from 16 to 17 while the theoretical, or stoichiometric, air-fuel ratio is 14.7. Therefore, even when fuel that is adhered to the top surface of each piston 14, or the inner wall of the cavity 21, is atomized, excessive air that is included in the air-fuel mixture is used for combustion of the atomized fuel. As a result, the amount of the atomized fuel that is discharged as unburned discharge gas is suppressed.

In the preferred embodiment, the ignition timing is set to the most delayed timing within the range that does not deteriorate the combustion during the execution of the compression stroke injection. Furthermore, the fuel injection timing is delayed according to the ignition timing. When the ignition timing is delayed, the air-fuel mixture is combusted when the pressure in the combustion chambers 15, or the internal pressure of the cylinders, is decreased. Thus, the combustion slows and continues through the exhaust stroke. As a result, the fuel that is adhered to the top surface of each piston is reliably combusted when the fuel is atomized. Thus, the amount of unburned discharge gas is suppressed in a suitable manner.

On the other hand, as shown in FIG. 5, when the coolant temperature during cranking THWST is within a predetermined temperature range R3 (THWST2<THWST≦THWST3), the intake stroke injection is selected for the fuel injection mode. In the preferred embodiment, a predetermined temperature THWST3 is equivalent to the coolant temperature when the engine is warm. The predetermined temperature THWST3 is, for example, 80 degrees Celsius.

During the execution of the intake stroke injection, fuel is injected during the intake stroke. Therefore, the combustion is executed when the injected fuel is substantially uniformly dispersed into the combustion chambers 15. In other words, the homogeneous charge combustion is executed. In the homogeneous charge combustion, the air-fuel ratio is set close to the theoretical, or stoichiometric, air-fuel ratio (A/F=14.7). Particularly, when the engine is cold, the air-fuel ratio is set less than the theoretical air-fuel ratio to stabilize the combustion. During the execution of the intake stroke injection, in which the homogeneous charge combustion is executed, the fuel injection period is long and the fuel is dispersed into the entire space of each combustion chamber 15 so that the fuel concentration in the vicinity of each spark plug 23 does not increase partially. Thus, the fuel injection amount is increased compared to the case when the compression stroke injection is executed.

In the predetermined temperature range R3, the engine is cold but the engine temperature is relatively high. Thus, the amount of unburned discharge gas in the emission gas is little. The compression stroke injection is effective for suppressing the amount of unburned discharge gas. However, since the ignition timing is greatly delayed, the fuel consumption is increased compared to the case when the intake stroke injection is executed. Therefore, in the predetermined temperature range R3, the intake stroke injection is selected as the fuel injection mode to suppress the deterioration of the fuel efficiency.

As shown in FIG. 5, in the predetermined temperature range R1, in which the coolant temperature during cranking THWST is less than the predetermined temperature THWST1, the intake stroke injection is selected for the fuel injection mode. In the predetermined temperature range R1, the engine temperature is low. Thus, the fuel injection amount needs to be greatly increased to stabilize the combustion. Therefore, in the predetermined temperature range R1, the intake stroke injection is selected for the fuel injection mode to maximize the fuel injection period.

The fuel injection amount Q during the execution of the compression stroke injection or the intake stroke injection is calculated according to, for example, the following formula (1).

$$Q = Qb \times K \tag{1}$$

Qb: Basic Fuel Injection Amount

K: Increase Coefficient

In the formula (1), the basic fuel injection amount Qb is calculated based on the condition of the engine such as the intake air amount (or intake pressure), which represents the engine load, and the engine speed. In the preferred embodiment, the fuel injection amount during the execution of the compression stroke injection and the intake stroke injection is basically determined in accordance with the intake air amount.

The increase coefficient K is increased or decreased in accordance with the basic fuel injection amount Qb determined, based on the condition of the engine. The increase coefficient K is calculated based on, for example, the fuel injection modes (intake stroke injection and compression stroke injection), the elapsed time period from when the engine is started, and the coolant temperature THW.

In the preferred embodiment, when the intake stroke injection is selected for the fuel injection mode, the increase coefficient K is corrected based on the fuel injection timing (fuel injection starting timing). When the fuel injection timing is relatively delayed, the fuel is injected when each piston 14 is close to the bottom dead center. Thus, the amount of injected fuel that adheres to the wall of each cylinder 12 increases. Most of the fuel that is adhered to the wall of each cylinder 12 is exhausted with lubricant from the corresponding combustion chamber 15. Therefore, the amount of injected fuel that is used for combustion decreases as the amount of delay of the fuel injection timing increases.

Figure 6:
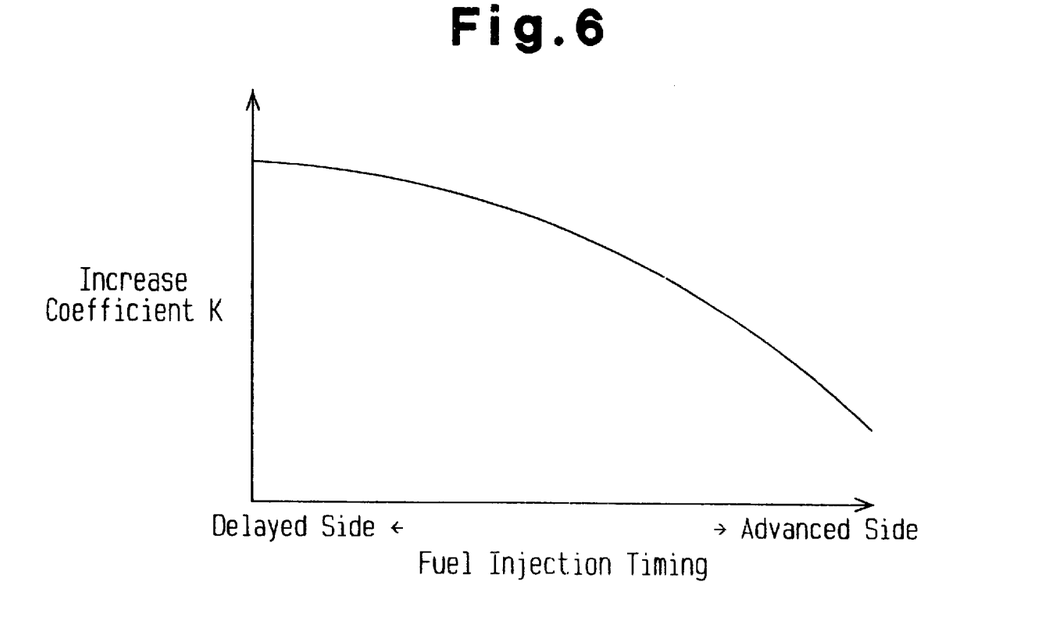
FIG. 6 is a map illustrating the relationship between the fuel injection timing and the increase coefficient of the fuel injection amount during the execution of an intake stroke injection.

In FIG. 6, the parameters that determine the increase coefficient K, are regarded as constant except the fuel injection timing. In the preferred embodiment, as shown in FIG. 6, the increase coefficient K is increased as the amount of delay in the fuel injection timing is increased during the execution of the intake stroke injection. By increasing the fuel injection amount Q based on the increase coefficient K, the decrease of the injected fuel due to the fuel adhesion to the wall of each cylinder 12 is suppressed. This suppresses the generation of a leaner air-fuel mixture. This process is referred to as a injection amount increasing process.

The ignition timing during the execution of the compression stroke injection and the intake stroke injection is calculated based on the condition of the engine, such as the intake air amount, which represents the engine load, and the engine speed. The actual ignition timing control is executed based on the calculated ignition timing, which is delayed or advanced in accordance with the requirement of each control.

Figure 2:
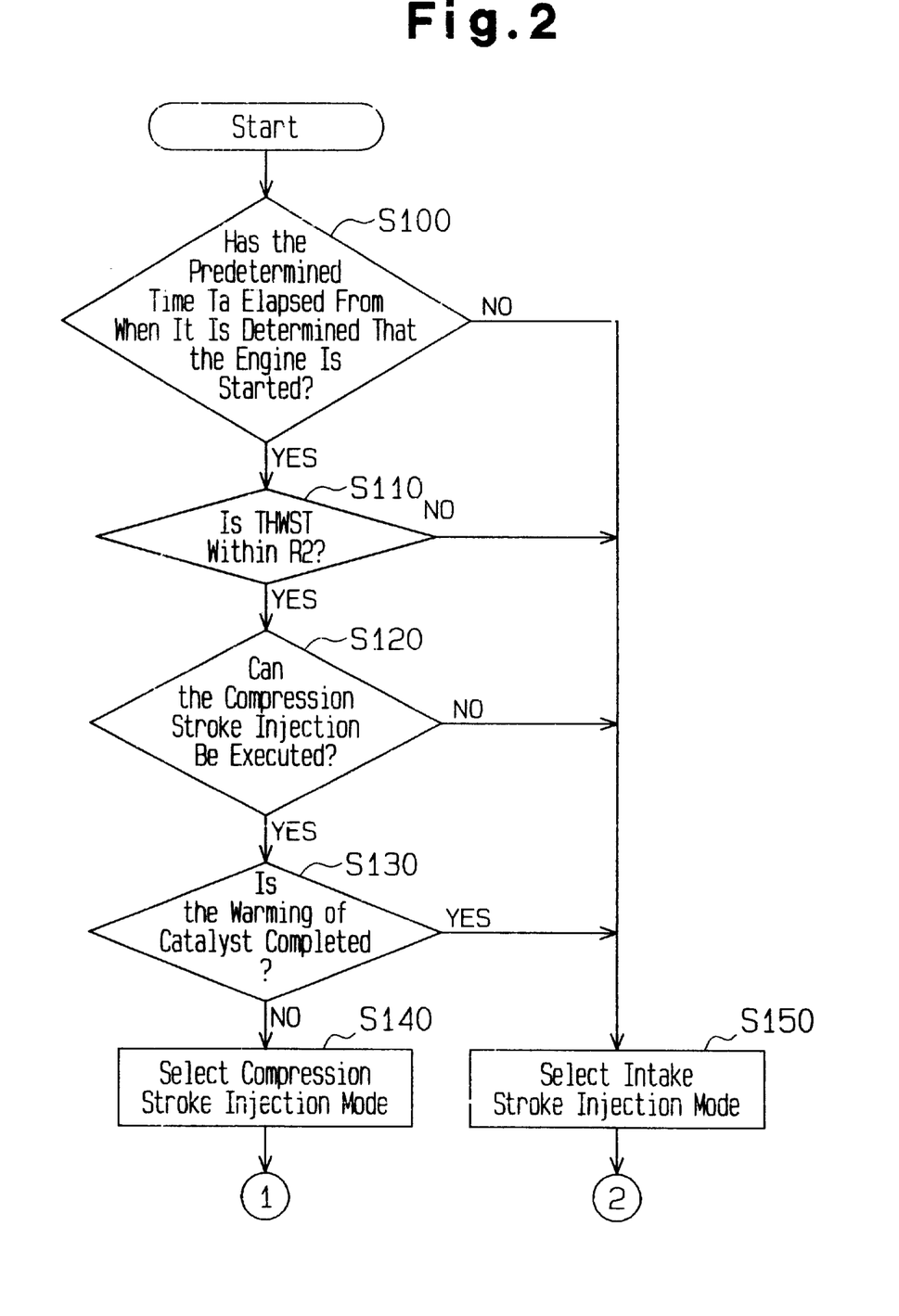
FIG. 2 is a flowchart showing a control procedure of a fuel injection control and an ignition timing control according to the preferred embodiment.
Figure 3:
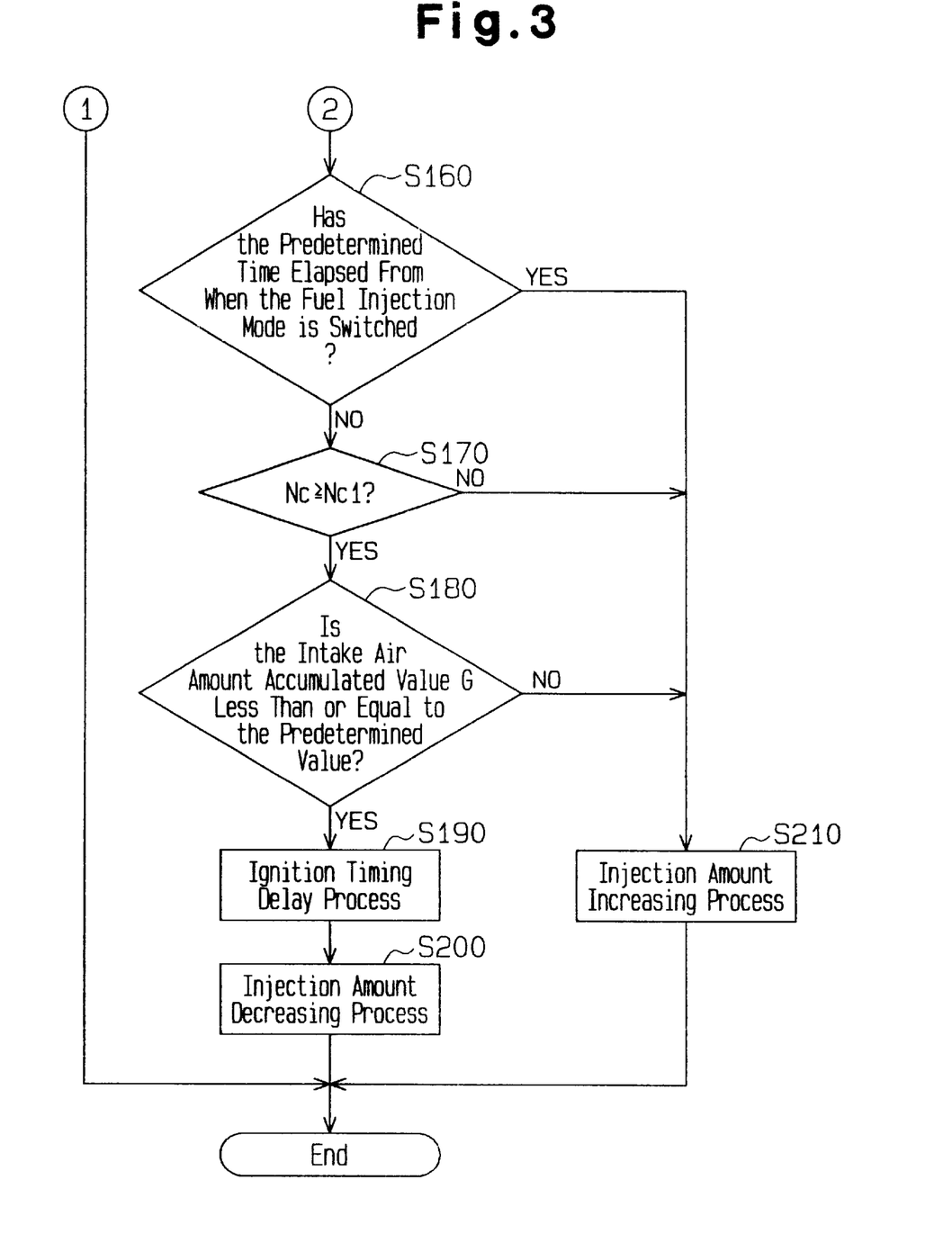
FIG. 3 is a continuation of the flow chart of FIG. 2 showing a control procedure of the fuel injection control and the ignition timing control according to the preferred embodiment.
Figure 4:
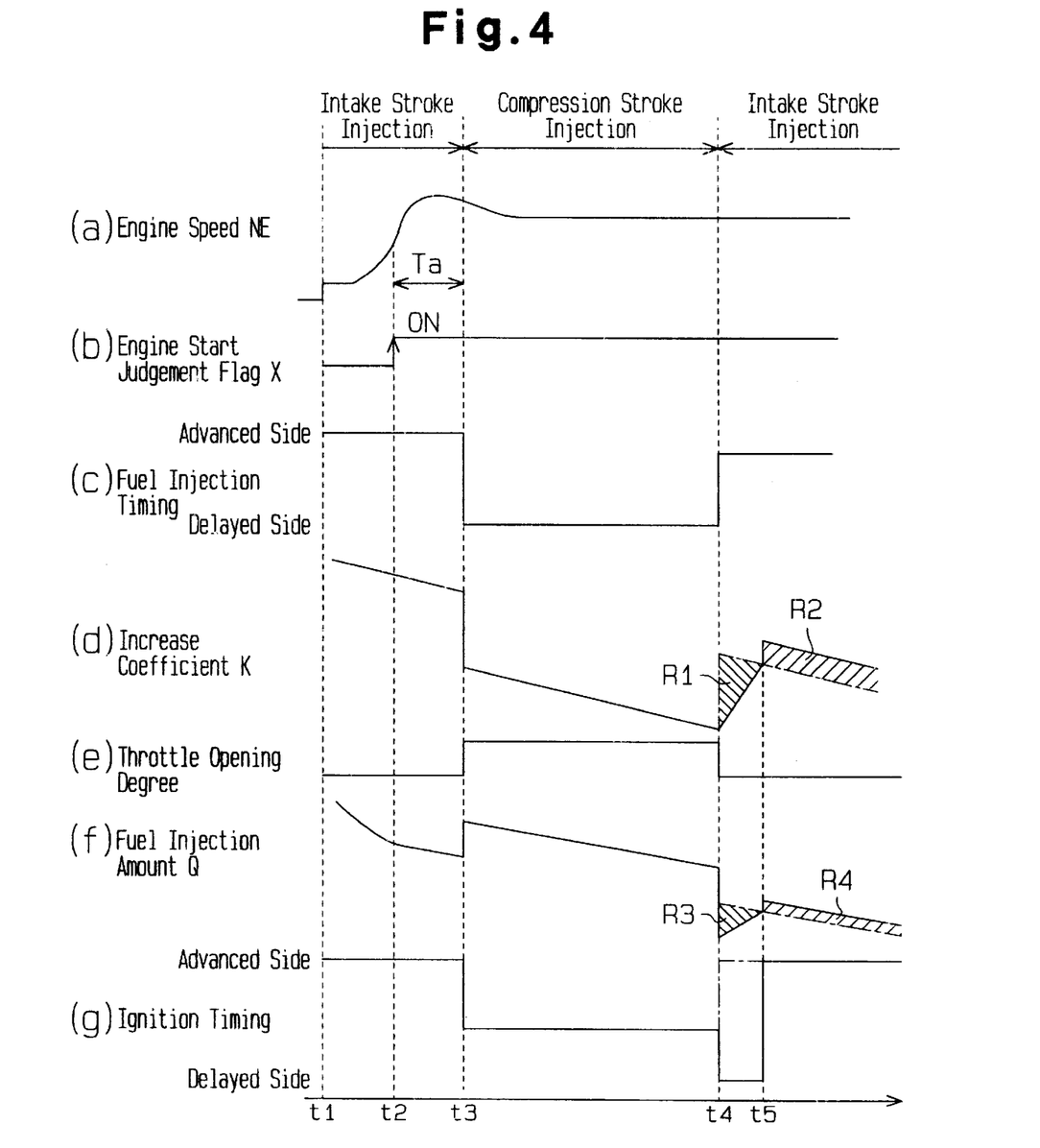
FIG. 4 is a timing chart illustrating an example of a state in which the fuel injection control and the ignition timing control are executed.

Procedures for executing the fuel injection control and the ignition timing control when the engine is cold will now be described with reference to FIGS. 2, 3 and 4. FIGS. 2 and 3 are flowcharts showing the procedure of each control. FIG. 4 is a timing chart showing an execution state of the fuel injection control and the ignition timing control. In FIG. 4, the lines (a), (b), (c), (d), (e), (f), and (g) show the temporal transitions of: (a) the engine speed NE, (b) an engine start judgment flag X, (c) the fuel injection timing, (d) the increase coefficient K, (e) the throttle opening degree, (f) the fuel injection amount Q, and (g) the ignition timing.

As shown in FIG. 4, when the engine is cranked (the time t1 in FIG. 4), the engine speed NE (see line (a) in FIG. 4) increases. When the engine speed reaches a predetermined speed that allows the internal combustion engine 10 to operate independently, it is determined that the internal combustion engine 10 is started. The engine start judgment flag X (see line (b) in FIG. 4) is then switched ON (time t2).

The starting of the engine needs to be facilitated from when the engine is cranked until a predetermined time Ta elapses after the engine start judgment is switched ON. Therefore, the intake stroke injection is constantly selected for the fuel injection mode to reliably inject the required amount of fuel at the cranking of the engine by maximizing the fuel injection period.

The procedures shown in FIGS. 2 and 3 are executed when two conditions are satisfied. The first condition is that the engine start judgment has been performed and the second condition is that the coolant temperature during cranking THWST is less than or equal to the predetermined temperature THWST3. In step 100 of FIG. 2, it is determined whether the predetermined time Ta (for example, 600 msec) has elapsed from when it is determined that the engine is started (when the engine start judgment flag X is switched ON). If it is determined that the predetermined time Ta has elapsed, that is, if the outcome of step 100 is positive, the ECU 40 proceeds to step 110. In step 110, it is determined whether the coolant temperature during cranking THWST is within the temperature range R2, which is shown in FIG. 5.

If it is determined that the coolant temperature during cranking THWST is within the temperature range R2 (i.e., the outcome of step 110 is positive), the ECU 40 proceeds to step 120. In step 120, it is determined whether the compression stroke injection can be executed.

When the following conditions are all satisfied, it is determined that the compression stroke injection can be executed.

(a) The fuel pressure is more than or equal to a predetermined pressure.

(b) The engine speed NE is less than or equal to the predetermined speed.

(c) The engine load is less than or equal to a predetermined load.

(d) The intake temperature is greater than or equal to a predetermined temperature.

If the condition (a) or (d) is not satisfied, the atomization of the injected fuel is not sufficient. If the condition (b) or (c) is not satisfied, it is difficult to obtain a predetermined fuel injection period. Therefore, the compression stroke injection cannot be executed in these cases.

If it is determined that all conditions of compression stroke injection are satisfied (i.e., the outcome of step 120 is positive), the ECU 40 proceeds to step 130. In step 130, it is determined whether the warming of the catalyst 24 is completed, in other words, whether the emission purification performance of the catalyst 24 is increased to a satisfactory level. More specifically, it is determined that the warming of the catalyst 24 is completed when the difference between the coolant temperature THWST and the current coolant temperature THW (Difference=THW−TWHST) is greater than or equal to a predetermined value.

If the warming of the catalyst 24 is not completed (i.e., the outcome of step 130 is negative), the ECU 40 proceeds to step 140. In step 140, the compression stroke injection is selected for the fuel injection mode and is executed during the time t3 to t4. As mentioned above, during the execution of the compression stroke injection, the throttle opening degree (see line (e) in FIG. 4) is set relatively large compared with the case when the intake stroke injection is executed. This increases the intake air amount. In addition, the ignition timing (see line (g) in FIG. 4) is most delayed within the range that does not deteriorate the combustion. Furthermore, the fuel injection timing (see line (c) in FIG. 4) is delayed in accordance with the ignition timing.

During the execution of the compression stroke injection, the number of fuel injections (hereinafter, referred to as the number of the compression stroke injections Nc) and the accumulated value of the intake air amount (hereinafter, referred to as the intake air amount accumulated value G) are calculated for the procedure that is taken when the fuel injection mode is switched afterwards. The calculated values are stored in the memory 41.

On the other hand, the ECU 40 proceeds to step 150 in the following cases: if the predetermined time Ta has not elapsed from when the engine start judgment was performed, that is, if the outcome of step 100 is negative; if the coolant temperature during cranking THWST is out of the temperature range R2, that is, if the outcome of step 110 is negative; if the conditions for executing compression stroke injection are not satisfied, that is, if the outcome of step 120 is negative; or if the warming of the catalyst 24 is completed, that is, if the outcome of step 130 is positive. In step 150, the intake stroke injection is selected for the fuel injection mode and is executed during the time t2 to t3 and after the time t4.

Subsequently, a set of processes or a process will be performed in accordance with the elapsed time from when the fuel injection mode is switched. More specifically, either an ignition timing delay process (step 190) and an injection amount decreasing process (step 200) or an injection amount increasing process (step 210) will be performed. The ignition timing delay process and the injection amount decreasing process are designed for suppressing the discharge amount of unburned component at the switching of the injection modes. The injection amount increasing process is designed for suppressing the generation of leaner air-fuel mixture caused by the fuel adhered to the wall of each cylinder.

In step 160 of FIG. 3, it is determined whether a predetermined time has elapsed from when the fuel injection mode is switched from the compression stroke injection to the intake stroke injection. More specifically, it is determined whether the number of fuel injections n from when the fuel injection mode is switched from the compression stroke injection to the intake stroke injection has reached a predetermined number of times Ni1. This determination predicts whether the fuel that is adhered to the top surface of each piston is continuously atomized. That is, if the number of fuel injections has reached the predetermined number of times Ni1, enough time has elapsed from when the fuel injection mode is switched. Therefore, it is determined that the atomization of the fuel is completed.

If it is determined that a predetermined time has not elapsed from when the fuel injection mode is switched, (i.e., if the outcome of step 160 is negative), the ECU 40 proceeds to steps 170 and 180. In steps 170 and 180, the amount of fuel that is adhered to the top surface of each piston when the fuel injection mode is switched (hereinafter, referred to as the fuel adhesion amount at switching Qa) is estimated based on the condition of the engine when the compression stroke injection is selected for the fuel injection mode. Then, it is determined whether the estimated fuel adhesion amount at switching Qa is greater than or equal to a predetermined amount.

More specifically, in step 170, it is determined whether the number of the compression stroke injections Nc is greater than or equal to a predetermined number of times Nc1. Fuel adhesion on the top surface of each piston occurs when the fuel is injected. Therefore, the number of the compression stroke injections Nc has high correlation with the fuel adhesion amount at switching Qa. In step 170, the fuel adhesion amount at switching Qa is estimated based on the number of the compression stroke injections Nc. Then, if the number of the compression stroke injections Nc is greater than or equal to the predetermined number of times Nc1, it is determined that the fuel adhesion amount at switching Qa is greater than or equal to the predetermined amount.

If it is determined that the number of the compression stroke injections Nc is greater than or equal to the predetermined number of times Nc1 (i.e., the outcome of step 170 is positive), the ECU 40 proceeds to step 180. In step 180, it is further determined whether the intake air amount accumulated value G is less than or equal to a predetermined value. The intake air amount accumulated value G has high correlation with the temperature of the top surface of each piston and the fuel adhesion amount at switching Qa, which varies in accordance with the above mentioned temperature. In step 180, the fuel adhesion amount at switching Qa is estimated based on the intake air amount accumulated value G. Then, if the intake air amount accumulated value G is less than or equal to the predetermined value, it is determined that the fuel adhesion amount at switching Qa is greater than or equal to the predetermined amount.

As described above, in the preferred embodiment, it is determined that the fuel adhesion amount at switching Qa is greater than or equal to the predetermined amount only when two conditions are both satisfied. The two conditions include that the number of the compression stroke injections Nc is greater than or equal to the predetermined number of times Nc1 and that the intake air amount accumulated value G is less than or equal to the predetermined value. This is due to the following reasons.

Figure 7:
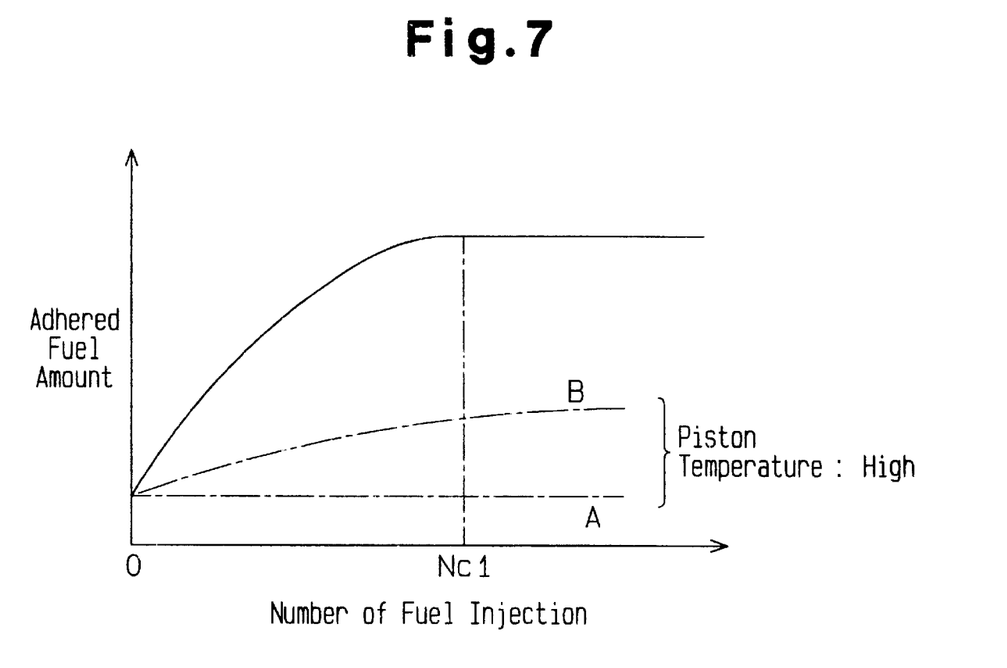
FIG. 7 is a diagram illustrating a transition of an adhered fuel amount during the execution of a compression stroke injection in correspondence with the number of fuel injections.

FIG. 7 illustrates the transition of the adhered fuel amount on the top surface of each piston in accordance with the fuel injection during the execution of the compression stroke injection.

As shown by a continuous line in FIG. 7, when the compression stroke injection is started, the adhered fuel amount gradually increases according to the increase of the number of the fuel injection. When the number of the fuel injection reaches the predetermined number of times Nc1, the amount of fuel that is adhered to the top surface of each piston by one fuel injection is balanced with the amount of fuel that is atomized from the top surface of each piston. Then, the adhered fuel amount is substantially constant. As described above, the number of fuel injections has high correlation with the transition of the adhered fuel amount. As a result, the fuel adhesion amount at switching Qa is estimated by monitoring the number of fuel injections.

Figure 8:
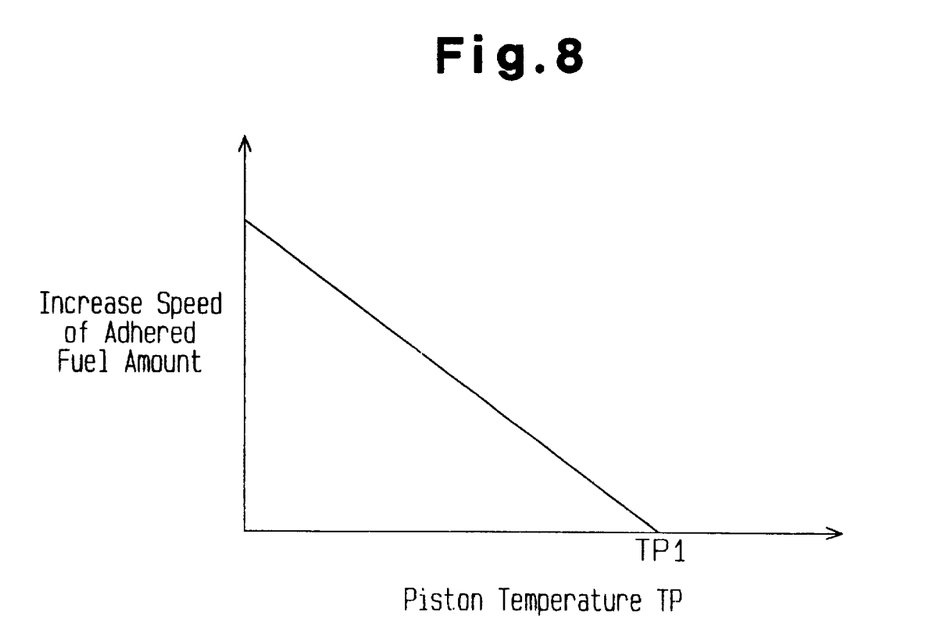
FIG. 8 is a diagram illustrating the relationship between the piston temperature and the increase speed of the adhered fuel amount for reaching the balanced state.
Figure 9:
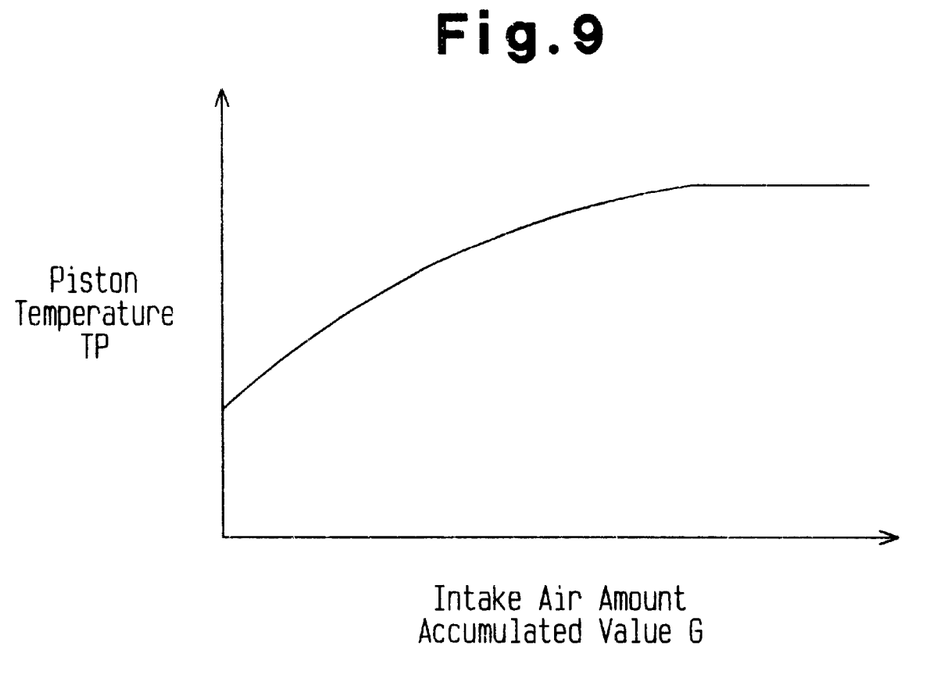
FIG. 9 is a diagram illustrating the relationship between the intake air amount accumulated value and the piston temperature during the execution of the compression stroke injection.

However, the transition of the adhered fuel amount depends not only on the number of fuel injections but also on the temperature of the top surface of each piston (hereinafter, referred to as the piston temperature TP) during the execution of the compression stroke injection. That is, as shown in FIG. 8, the lower the piston temperature TP is, the faster the increase speed of the adhered fuel amount is for reaching the balanced state. On the other hand, if the piston temperature TP is greater than or equal to a predetermined temperature TP1, the adhered fuel on the top surface of each piston is atomized completely before the fuel injection is performed. Therefore, the adhered fuel amount on the top surface of each piston does not increase.

Therefore, as shown by chain lines A, B in FIG. 7, if the piston temperature TP is high, most of the fuel that is adhered to the top surface of each piston is atomized before the next fuel injection. Therefore, when the number of the compression stroke injections Nc reaches the predetermined number of times Nc1, the adhered fuel amount is not at all increased (see chain line A) or increased very slightly (see chain line B). In these cases, there is no significant need for executing the ignition timing delay process or the injection amount decreasing process to suppress the amount of unburned discharge gas. The processes are rather not to be executed to suppress the decrease of the engine output.

Generally, it is difficult to directly detect the piston temperature TP. However, the piston temperature TP may be determined from the total combustion heat generated in the combustion chambers during the execution of the compression stroke injection. The total combustion heat is determined by the intake air amount accumulated value G, which has high correlation with the accumulated value of the fuel injection amount Q. Therefore, the piston temperature TP and the intake air amount accumulated value G has relation such as that shown in FIG. 9. Therefore, the piston temperature TP is determined based on the intake air amount accumulated value G.

In the preferred embodiment, the intake air amount accumulated value G, which has correlation with the piston temperature TP, is monitored. Then, the fuel adhesion amount at switching Qa is estimated based on the intake air amount accumulated value G. If the intake air amount accumulated value G is greater than the predetermined value, the increase speed of the adhered fuel amount for reaching the balanced state is slow. Therefore, it is determined that the fuel adhesion amount at switching Qa has not reached the predetermined amount. Then, it is determined that there is no significant need for executing the processes to suppress the amount of unburned discharge gas and the processes are not executed.

In the procedure shown in FIG. 3, if it is determined that the number of the compression stroke injections Nc is less than the predetermined number of times Nc1 (i.e., the outcome of step 170 is negative), or if it is determined that the intake air amount accumulated value G is greater than the predetermined value (i.e., the outcome of step 180 is negative), the ECU 40 determines that the fuel adhesion amount at switching Qa is less than the predetermined amount.

If it is determined that the fuel adhesion amount at switching Qa is less than the predetermined amount (i.e., the outcomes of one of steps 170, 180 are negative), or if it is determined that the predetermined time has elapsed from when the fuel injection mode is switched (i.e., the outcome of step 160 is positive), the ECU 40 proceeds to step 210. In step 210, the injection amount increasing process is executed. In other words, the increase coefficient K is increased as the amount of delay in the fuel injection timing is increased. In FIG. 4, the chain line portion of each line (d) and (f) after the time t5 represents the transition of the increase coefficient K and the fuel injection amount Q when the injection amount increasing process is not executed, respectively. Therefore, the sizes of the shaded areas R2, R4 along lines (d) and (f) in FIG. 4 are the increase coefficient K of the injection amount increasing process and the correction amount of the fuel injection amount Q, respectively.

The injection amount increasing process is only performed during the execution of the intake stroke injection after the time t4 as shown in FIG. 4. This is because during the execution of the intake stroke injection during the time t1 to t3, the increase coefficient K is sufficiently increased to obtain stable engine starting. Therefore, the fuel injection amount Q is also set to a sufficiently increased amount. Thus, the leaner air-fuel mixture caused by the fuel adhering to the wall of each cylinder is rarely caused.

On the other hand, if it is determined that the number of the compression stroke injections Nc is greater than or equal to the predetermined number of times Nc1 (i.e., the outcome of step 170 is positive), and it is further determined that the intake air amount accumulated value G is less than or equal to the predetermined value (i.e., the outcome of step 180 is positive), the ECU 40 determines that the fuel adhesion amount at switching Qa is greater than or equal to the predetermined amount. The ECU 40 then proceeds to step 190. In step 190, the ignition timing delay process is executed. In other words, the ignition timing, which is determined based on the condition of the engine such as the intake air amount and the engine speed, is delayed. Alternatively, the ignition timing is delayed after being advanced or delayed in accordance with other control requirements. As a result, the ignition timing is delayed during the predetermined period, that is, the time t4 to t5, from when the fuel injection mode is switched from the compression stroke injection to the intake stroke injection. In FIG. 4, the chain line portion of line (g) during the time t4 to t5 represents the transition of the ignition timing when the ignition timing delay process is not performed.

By executing the ignition timing delay process, the air-fuel mixture is combusted when the internal pressure of the cylinder is decreased during the predetermined period. Thus, the combustion slows and continues for a long time accordingly. As a result, the fuel that is adhered to the top surface of each piston is reliably combusted when the fuel is atomized.

Furthermore, when the ignition timing delay process is executed, the injection amount decreasing process is also executed in step 200. In the injection amount decreasing process, the increase coefficient K is corrected using, for example, the following formula.

$$K \leftarrow K - (1 - n/\text{Ni}1) \cdot \alpha \qquad (2)$$

n: number of fuel injections after the fuel injection mode is switched

Ni1: predetermined number of times

α: coefficient

In FIG. 4, chain line portion of each line (d) and (f) during the time t4 to t5 represents the transition of the increase coefficient K and the fuel injection amount Q when the injection amount decreasing process is not executed, respectively. Therefore, the sizes of the shaded areas R1, R3 along lines (d) and (f) in FIG. 4 are the increase coefficient K of the injection amount decreasing process and the correction amount of the fuel injection amount Q, respectively.

By executing the injection amount decreasing process, an increased amount of air required for combustion is obtained when the fuel that is adhered to the top surface of each piston is combusted. This promotes the combustion of the atomized fuel. Furthermore, decrease of the fuel injection amount Q counteracts an increase of engine output that is caused by the combustion of the atomized fuel.

As shown by the above formula (2) and chain lines (d) and (f) in FIG. 4, in the injection amount decreasing process, the correction amount ((1−n/Ni1)·α) of the increase coefficient K is decreased as the number of fuel injections n after the fuel injection mode is switched is increased, or as the elapsed time from when the fuel injection mode is switched is increased. That is, when decreasing the fuel injection amount Q after the fuel injection mode is switched, the correction amount gradually decreases in accordance with the number of fuel injections after the switching. This is because the amount of fuel that is atomized from the top surface of each piston gradually decreases as the time elapses from when the fuel injection mode is switched.

After the ignition timing delay process and the injection amount decreasing process are executed in steps 190 and 200, or after the injection amount increasing process is executed in step 210, the ECU 40 temporarily terminates the procedure.

The control apparatus according to the preferred embodiment provides the following advantages.

When the fuel injection mode is switched from the compression stroke injection to the intake stroke injection, the ignition timing during intake stroke injection is delayed for the predetermined period from the switching. Therefore, the combustion period is long and the fuel that is adhered to the top surface of each piston is reliably combusted when the fuel is atomized. As a result, the amount of unburned discharge gas is decreased and the deterioration of the emission quality, which is caused by the increase of unburned discharge gas, is suppressed.

When the ignition timing is delayed, the fuel injection amount Q during the intake stroke injection is decreased. Therefore, when the fuel that is adhered to the top surface of each piston is atomized and combusted, increased amount of air required for combustion is obtained. As a result, the combustion of the atomized fuel is further promoted. This suppresses the deterioration of the emission quality, which is caused by the increase of unburned discharge gas, in a more suitable manner.

In addition, decrease of the fuel injection amount Q counteracts an increase of engine output caused by the combustion of the atomized fuel. This suppresses the fluctuations of the engine output during the switching of the fuel injection mode.

The fuel adhesion amount at switching Qa is estimated based on the engine condition during the execution of the compression stroke injection. If the fuel adhesion amount at switching Qa is greater than or equal to the predetermined amount, the ignition timing delay process and the injection amount decreasing process are executed. Therefore, the ignition timing delay process is not performed if there is no significant need for suppressing the amount of unburned discharge gas. This suppresses the decrease of the engine output.

The fuel adhesion amount at switching Qa is estimated based on the number of the compression stroke injections Nc and the intake air amount accumulated value G. The compression stroke injections Nc and the intake air amount accumulated value G are highly correlated with the fuel adhesion amount at switching Qa. Therefore, the fuel adhesion amount at switching Qa is estimated based on the number of the compression stroke injections Nc and the intake air amount accumulated value G in a suitable manner.

Furthermore, it is determined that the fuel adhesion amount at switching Qa is greater than or equal to the predetermined amount only when two conditions are both satisfied. The first condition is that the number of the compression stroke injections Nc is greater than or equal to the predetermined number of times Nc1. The second condition is that the intake air amount accumulated value G is less than or equal to the predetermined value. The ignition timing delay process and the injection amount decreasing process are executed based on whether these conditions are met. As a result, the ignition timing delay process is executed after more reliably determining that the fuel adhesion amount at switching Qa is greater than or equal to the predetermined amount. Therefore, the ignition timing delay process is not executed if there is no significant need for suppressing the amount of unburned discharge gas. This suppresses the decrease of the engine output.

The preferred embodiment of the present invention may be changed as follows.

In the preferred embodiment, it is determined that the fuel adhesion amount at switching Qa is greater than or equal to the predetermined amount only when two conditions, which include that the number of the compression stroke injections Nc is greater than or equal to the predetermined number of times Nc1 and that the intake air amount accumulated value G is less than or equal to the predetermined value, are satisfied. However, it may be determined that the fuel adhesion amount at switching Qa is greater than or equal to the predetermined amount when at least one of the two conditions are met. Also, the accumulated value of the fuel injection amount Q during the execution of the compression stroke injection may be used instead of the intake air amount accumulated value G.

In the preferred embodiment, ignition timing delay process of step 190 in FIG. 3 and the injection amount decreasing process of step 200 in FIG. 3 are both executed during the predetermined period from when the fuel injection mode is switched from the compression stroke injection to the intake stroke injection. However, it may be changed such that only one of the processes is executed.

Each process of step 170 and 180 in FIG. 3 according to the preferred embodiment may be changed with the following embodiments (a), (b).

(a) As mentioned above, the intake air amount accumulated value G is highly correlated with the increase speed of the adhered fuel amount on the top surface of each piston for reaching the balanced state. Therefore, in the process of step 160, the predetermined number of times Nc1 may be varied based on the intake air amount accumulated value G. The varied predetermined number of times Nc1 (or less number) may be set as the number of the compression stroke injections required for the amount of fuel that is adhered to the top surface of each piston to reach the balanced state. The ECU 40 then determines that the fuel adhesion amount at switching Qa is greater than or equal to the predetermined amount if the number of the compression stroke injections Nc is greater than or equal to the predetermined number of times Nc1. The ECU 40 then executes the ignition timing delay process in step 190 and the injection amount decreasing process in step 200. In this case, the fuel adhesion amount at switching Qa is accurately estimated. Instead of the intake air amount accumulated value G, the accumulated value of the fuel injection amount Q during the execution of the compression stroke injection may be used.

(b) The intake air amount accumulated value G is highly correlated with the increase speed of the adhered fuel amount on the top surface of each piston for reaching the balanced state. As shown in FIG. 7, the increase amount of the fuel adhesion from when the compression stroke injection is selected until the fuel adhesion amount reaches the balanced state is substantially proportional to the product of the increase speed multiplied by the number of fuel injections. The fuel adhesion amount at the balanced state varies according to the shape of the cavity 21 and may be obtained, for example, by experiments. Therefore, the fuel adhesion amount at switching Qa is calculated based on the following formula (3).

$$Qa \leftarrow KQ \cdot G \cdot Nc \qquad (3)$$

(If Qa is greater than Qamax, Qa is substituted by Qamax.)

KQ: constant number

Qamax: adhered fuel amount on the top surface of each piston at balanced state

When the fuel adhesion amount at switching Qa, which is calculated with the above formula, is greater than or equal to the predetermined amount, the ignition timing delay process in step 190 and the injection amount decreasing process in step 200 are executed. In this case, the fuel adhesion amount at switching Qa is accurately estimated. As mentioned in (a), instead of the intake air amount accumulated value G, the accumulated value of the fuel injection amount Q during the execution of the compression stroke injection may be used.

According to the preferred embodiment, the ignition timing delay process and the injection amount decreasing process are executed during the predetermined period from when the fuel injection mode is switched to the injection stroke injection. However, for example, the fuel adhesion amount at switching Qa may be estimated based on the condition of the engine when the compression stroke injection is selected for the fuel injection mode. The predetermined period may be varied based on the estimated fuel adhesion amount at switching Qa. More specifically, for example, the fuel adhesion amount at switching Qa may be estimated using the formula (3). If the fuel adhesion amount at switching Qa is greater than or equal to the predetermined amount, the greater the fuel adhesion amount at switching Qa is, the longer the predetermined period may be. In this case, the fuel adhesion amount at switching Qa is estimated in a suitable manner. The execution periods of the ignition timing delay process and the injection amount decreasing process are adjusted in a suitable manner to suppress the amount of unburned discharge gas based on the estimated result.

Therefore, the present examples and embodiments are to be considered as illustrative and not restrictive and the invention is not to be limited to the details given herein, but may be modified within the scope and equivalence of the appended claims.

What is claimed is:

1. A control apparatus for a cylinder injection type internal combustion engine, wherein the fuel injection mode of the engine is switched between a compression stroke injection and an intake stroke injection, and wherein, when the engine is cold, the compression stroke injection is selected for the injection mode so that injected fuel collides with the top surface of a piston and is directed toward the vicinity of a spark plug, the control apparatus comprising a delay correction means, wherein, when the fuel injection mode is switched from the compression stroke injection to the intake stroke injection when the engine is cold, the delay correction means delays the ignition timing during the execution of the intake stroke injection from when the fuel injection mode is switched until a predetermined period elapses compared with a case when the fuel injection mode is not switched.

2. The control apparatus according to claim 1 further comprising a determining means, wherein, based on the condition of the engine when the compression stroke injection is selected for the fuel injection mode, the determining means estimates the amount of fuel adhered on the top surface of the piston at time when the fuel injection mode is switched from the compression stroke injection to the intake stroke injection, and wherein the determining means determines whether the estimated adhered fuel amount is greater than or equal to a predetermined amount, and wherein, if the determining means determines that the estimated adhered fuel amount is greater than or equal to the predetermined amount, the delay correction means executes delay correction of the ignition timing.

3. The control apparatus according to claim 1 further comprising a decrease correction means, wherein, when the delay correction means delays the ignition timing, the decrease correction means decreases the fuel injection amount during the execution of the intake stroke injection.

4. The control apparatus for a cylinder injection type internal combustion engine according to claim 3 further comprising a determining means, wherein, when the fuel injection modes are switched from the compression stroke injection to the intake stroke injection, an adhered fuel amount on the top surface of the piston is estimated based on the condition of the engine when the compression stroke injection is selected for the fuel injection mode, and the determining means determines whether the estimated adhered fuel amount is greater than or equal to a predetermined amount, and wherein, when the determining means determines that the estimated adhered fuel is greater than or equal to the predetermined amount, the delay correction means executes delay correction of the ignition timing.

5. The control apparatus according to claim 4, wherein the determining means estimates the adhered fuel amount based on the number of the fuel injection during the execution of the compression stroke injection, and if the number of fuel injections is greater than or equal to a predetermined number of times, the determining means determines that the adhered fuel amount is greater than or equal to the predetermined amount.

6. The control apparatus according to claim 4, wherein the determining means estimates the adhered fuel amount based on the fuel injection amount accumulated value or a value that is correlated with the accumulated value during the execution of the compression stroke injection, and wherein, if the fuel injection amount accumulated value or the correlated value is less than or equal to a predetermined value, the determining means determines that the adhered fuel amount is greater than or equal to the predetermined amount.

7. The control apparatus according to claim 4, wherein the determining means estimates the adhered fuel amount based on the number of the fuel injection and the fuel injection amount accumulated value or a value that is correlated with the accumulated value during the execution of the compression stroke injection, and wherein, if the number of fuel injections is greater than or equal to a predetermined number of times and the fuel injection amount accumulated value or the correlated value is less than or equal to a predetermined value, the determining means determines that the adhered fuel amount is greater than or equal to the predetermined amount.

8. The control apparatus according to claim 1 further comprising an increase correction means, wherein the increase correction means increases the fuel injection amount as the fuel injection timing is delayed during the execution of the intake stroke injection.

9. The control apparatus according to claim 1 further comprising a setting means, wherein, based on the condition of the engine during the execution of the compression stroke injection, the setting means estimates the amount of fuel adhered on the top surface of the piston at the time when the fuel injection mode is switched from the compression stroke injection to the intake stroke injection, and wherein the setting means extends the predetermined period as the estimated adhered fuel amount increases.

10. A control apparatus for a cylinder injection type internal combustion engine, wherein the fuel injection mode of the engine is switched between a compression stroke injection and an intake stroke injection, and wherein, when the engine is cold, the compression stroke injection is selected for the injection mode so that injected fuel collides with the top surface of a piston and is directed toward the vicinity of a spark plug, the control apparatus comprising;

decrease correction means, wherein, when the fuel injection mode is switched from the compression stroke injection to the intake stroke injection, the decrease correction means decreases the fuel injection amount during the execution of the intake stroke injection from when the fuel injection mode is switched until a predetermined period elapses; and determining means, wherein, based on the condition of the engine when the compression stroke injection is selected for the fuel injection mode, the determining means estimates the amount of fuel adhered on the top surface of the piston at time when the fuel injection mode is switched from the compression stroke injection to the intake stroke injection, and wherein the determining means determines whether the estimated adhered fuel amount is greater than or equal to a predetermined amount, wherein, if the determining means determines that the estimated adhered fuel is greater than or equal to the predetermined amount, the decrease correction means executes decrease correction of the fuel injection amount.

11. The control apparatus according to claim 10, wherein the determining means estimates the adhered fuel amount based on the number of the fuel injection during the execution of the compression stroke injection, and if the number of fuel injections is greater than or equal to a predetermined number of times, the determining means determines that the adhered fuel amount is greater than or equal to the predetermined amount.

12. The control apparatus according to claim 10, wherein the determining means estimates the adhered fuel amount based on the fuel injection amount accumulated value or a value that is correlated with the accumulated value during the execution of the compression stroke injection, and wherein, if the fuel injection amount accumulated value or the correlated value is less than or equal to a predetermined value, the determining means determines that the adhered fuel amount is greater than or equal to the predetermined amount.

13. The control apparatus according to claim 10, wherein the determining means estimates the adhered fuel amount based on the number of the fuel injection and the fuel injection amount accumulated value or a value that is correlated with the accumulated value during the execution of the compression stroke injection, and wherein, if the number of fuel injections is greater than or equal to a predetermined number of times and the fuel injection amount accumulated value or the correlated value is less than or equal to a predetermined value, the determining means determines that the adhered fuel amount is greater than or equal to the predetermined amount.

14. A control apparatus for a cylinder injection type internal combustion engine, wherein the fuel injection mode of the engine is switched between a compression stroke injection and an intake stroke injection, and wherein, when the engine is cold, the compression stroke injection is selected for the injection mode so that injected fuel collides with the top surface of a piston and is directed toward the vicinity of a spark plug, the control apparatus comprising;

decrease correction means, wherein, when the fuel injection mode is switched from the compression stroke injection to the intake stroke injection, the decrease means decreases the fuel injection amount during the execution of the intake stroke injection from when the fuel injection mode is switched until a predetermined period elapses compared with a case when the fuel injection mode is not switched; and setting means, wherein, based on the condition of the engine during the execution of the compression stroke injection, the setting means estimates the amount of fuel adhered on the top surface of the piston at the time when the fuel injection mode is switched from the compression stroke injection to the intake stroke injection, and wherein the setting means extends the predetermined period as the estimated adhered fuel amount increases.

15. A control method for a cylinder injection type internal combustion engine, wherein the fuel injection mode of the engine is switched between a compression stroke injection and an intake stroke injection, and wherein, when the engine is cold, the compression stroke injection is selected so that injected fuel collides with the top surface of a piston and is directed toward the vicinity of a spark plug, the control method comprising:

when the fuel injection mode is switched from the compression stroke injection to the intake stroke injection when the eingine is cold, delaying the ignition timing during the execution of the intake stroke injection from when the fuel injection mode is switched until a predetermined period elapses compared with a case when the fuel injection modes are not switched.

16. The control method according to claim 15, further comprising:

estimating the amount of fuel adhered on the top surface of the piston at the time when the fuel injection mode is switched from the compression stroke injection to the intake stroke injection based on the condition of the engine during the execution of the compression stroke injection; and determining whether the estimated adhered fuel amount is greater than or equal to a predetermined amount;

wherein a delay correction of the ignition timing is executed if the estimated adhered fuel amount is greater than or equal to the predetermined amount.

17. The control method according to claim 15, further comprising decreasing the fuel injection amount during the execution of the intake stroke injection when the ignition timing is delayed.

* * * * *